United States Patent
Jana et al.

(10) Patent No.: US 11,048,313 B2
(45) Date of Patent: Jun. 29, 2021

(54) SYSTEM-WIDE NETWORK ACTIVITY FORECASTING FOR PERFORMANCE IMPROVEMENT

(71) Applicant: Intel Corporation, Santa Clara, CA (US)

(72) Inventors: Siddhartha Jana, Hillsboro, OR (US); Federico Ardanaz, Hillsboro, OR (US); Jonathan M. Eastep, Portland, OR (US); Yaxin Shui, San Diego, CA (US); Keith Underwood, Powell, TN (US)

(73) Assignee: Intel Corporation, Santa Clara, CA (US)

( * ) Notice: Subject to any disclaimer, the term of this patent is extended or adjusted under 35 U.S.C. 154(b) by 131 days.

(21) Appl. No.: 16/369,580

(22) Filed: Mar. 29, 2019

(65) Prior Publication Data

US 2020/0310515 A1 Oct. 1, 2020

(51) Int. Cl.
*G06F 1/24* (2006.01)
*G06F 9/00* (2006.01)
*G06F 1/3206* (2019.01)
*G06F 1/3234* (2019.01)

(52) U.S. Cl.
CPC .......... *G06F 1/3206* (2013.01); *G06F 1/3234* (2013.01)

(58) Field of Classification Search
CPC .............................. G06F 1/3206; G06F 1/3234
See application file for complete search history.

(56) References Cited

U.S. PATENT DOCUMENTS

| | | | |
|---|---|---|---|
| 2010/0191997 A1* | 7/2010 | Dodeja | G06F 1/3225 713/323 |
| 2014/0075217 A1* | 3/2014 | Wong | H04L 12/6418 713/320 |
| 2014/0140213 A1* | 5/2014 | Raleigh | H04L 65/601 370/235 |

* cited by examiner

*Primary Examiner* — Nitin C Patel
(74) *Attorney, Agent, or Firm* — Green, Howard & Mughal LLP

(57) ABSTRACT

Described herein are automated hierarchical feed-back driven control mechanisms and methods, including an apparatus comprising a first circuitry, a second circuitry, and a third circuitry. The first circuitry may be operable to receive a system operating characteristic guidance. The second circuitry may be operable to provide one or more manufacturing characteristics. The third circuitry may be operable to store one or more system operating characteristics based upon the system operating characteristic guidance and the one or more manufacturing characteristics.

16 Claims, 14 Drawing Sheets

SYSTEM-WIDE NETWORK ACTIVITY FORECASTING FOR PERFORMANCE IMPROVEMENT

STATEMENT OF GOVERNMENT INTEREST

This invention was made with Government support under Agreement No. H98230A-13-D-0124-08 awarded by the Department of Defense. The Government has certain rights in this invention.

BACKGROUND

Applications that operate on systems with high-bandwidth network fabric may undergo phases of diminished activity. These software phases may correspond to sections of code that target other non-network components of the system, such as processors or storage units. As a result, high performance systems that service user applications may undergo periods of varying network utilization.

Unfortunately, present-day network components might not may be oblivious of dynamic variations in utilization of the network bandwidth, and may consume power regardless of an amount or relative percentage of bandwidth actually used.

This may have various detrimental impacts. First, this may affect a total power consumed by an entire system and/or by individual network hardware components. Second, this may present a missed opportunity for utilizing wasted energy to boost the performance of other non-network system components, which may indirectly affect system efficiency.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

DETAILED DESCRIPTION

Figure 1:
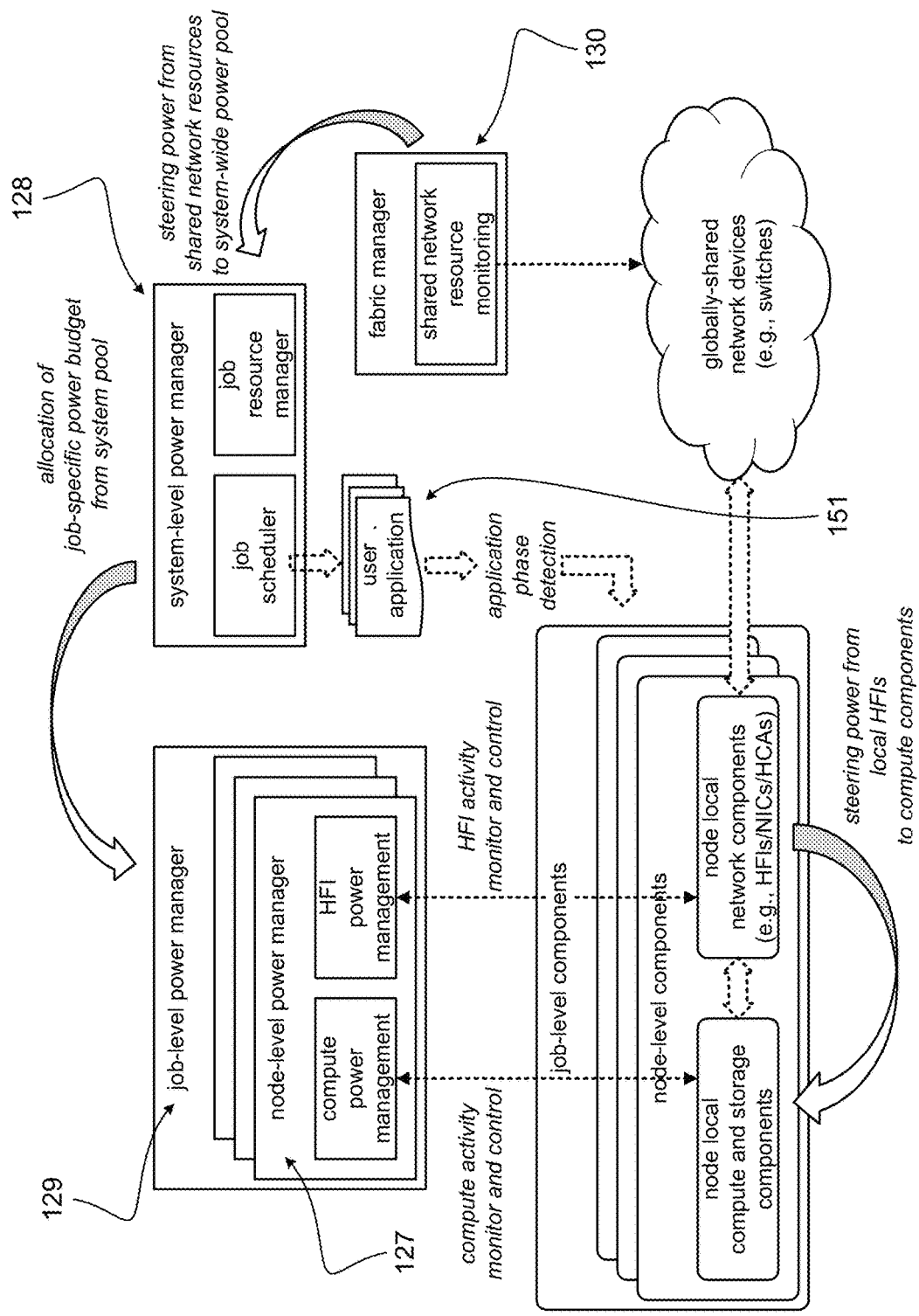
FIG. 1 illustrates an example operation flow, in accordance with some embodiments of the disclosure.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Applications that operate on systems with high-bandwidth network fabric may be characterized by periods of minimal network activity, and sometimes negligible network activity. These software phases may correspond to sections of code that target other non-network components of the system, such as processors (in cases of computationally-intensive applications) or storage units (in cases of data-driven and/or memory-intensive applications). Additionally, multiple applications running in parallel on such systems may be characterized with network demands that are significantly different from each other. As a result, high performance systems that service user applications may undergo periods of varying network utilization.

Unfortunately, present-day network components (for example, fabric managers, network cards, switches, and optical links) may be oblivious of dynamic variations in utilization of the network bandwidth, and may consume power regardless of an amount or relative percentage of bandwidth actually used. This may have various detrimental impacts. First, this may affect the total power consumed by an entire system and/or by individual network hardware components. Second, this may present a missed opportunity for utilizing wasted energy to boost the performance of other non-network system components, which may indirectly affect system efficiency.

Accordingly, it may be advantageous to dynamically monitor and/or control a bandwidth of a system fabric in response to demands of one or more user applications. Current state-of-the-art interconnect solutions might not possess sufficient interoperability between user applications and a fabric manager to facilitate or even enable such dynamic monitoring and control.

Discussed herein are mechanisms and methods for implementing a system stack that incorporates multiple hardware and software components interoperating with each other to: (a) detect and forecast demands for network bandwidth by user applications; (b) reactively and proactively control bandwidth demands and supplies by applications and network hardware, respectively; and (c) redirect unused power to boost application efficiency and/or system efficiency.

These mechanisms and methods address various technical challenges which arise from design deficiencies of host fabric interfaces deployed in data centers and HPC systems, including: (1a) accurately and timely detecting occurrences of high network activity and low network activity imposed by the dedicated resources servicing any application onto shared system resources; (1b) accurately and timely detecting occurrence of high network activity and low network activity imposed by shared systems resources onto the dedicated resources servicing any user application; (2) responding to low network activity in such a manner as to raise system efficiency; (3) minimizing performance costs and power costs imposed by the design of power management solutions on network components; and (4) minimizing performance costs and power costs impacting independent system components that share a power budget with a set of network components.

Accurately and timely detecting occurrences of high network activity and low network activity may be challenging because network devices may be, by design, oblivious of past demands and/or future demands of user applications, over short periods of time and extended periods of time. They may therefore lack the capability of detecting short and extended bursts of high network activity and/or low network activity, at the right time and with high confidence levels.

Responding to low network activity in such a manner as to raise system efficiency may be challenging because actual demands of a network device (as measured in bandwidth) might not be limited to fixed, predefined discrete values, but may instead span a continuous range. From a network device's point of view, these values may be non-deterministic. Despite the visibility of these values to application programmer, there may not exist either an automated mechanism or a communication channel that maps a variation in network activity to a gain in system efficiency.

Minimizing performance costs and power costs imposed by the design of power management solutions on network components may be challenging because of hardware design constraints that may lead to minimal, but non-negligible transition costs (in time) among multiple discrete power and/or performance states within various network devices. Not accounting for such costs might affect transmission and arrival of fabric packets, which in turn could offset the performance of the devices during execution of network-intensive code paths.

Minimizing performance costs and power costs impacting independent system components that share a power budget with a set of network components may also be challenging. A variation in distributed communication within an application may impact not only traffic on local network resources (e.g., Host Fabric Interfaces (HFIs), Network Interface Controllers (NICs), and/or Host Channel Adapters (HCAs)), but also traffic on other remote components that share the same fabric (e.g., switches and routers). The extent of such collateral impact may take the form of additional traffic initiated by packets from remote components through the communication channel (which may also be referred to as backpressure). This in turn may lead to unanticipated fabric performance. Setting an HFI to a lower-power state may render it incapable of transmitting and receiving high bandwidth network data. If unexpected demand for network activity occurs during such a state, it may lead to buffering or even dropping of data packets. In turn, that may lead to a performance impact on remote devices and/or local devices connected to the HFI (e.g., switches), as well as on corresponding user applications using them. In order to avoid this, an HFI may be switched into a low power state when there is high confidence that there will be no unanticipated HFI activity during that period.

One conceivable solution might be for a system to permit transmitters of a network device to autonomously power down on detecting zero network activity. However, that solution may rely solely upon current activity at a physical layer of a network device and may involve investing additional "monitoring" time by sensors before actuators can gain confidence in completely powering down a device. In contrast, the methods and mechanisms disclosed herein may advantageously be capable of forecasting future network loads by learning from past usage activity. This may make it possible to power down a device with higher confidence when the device enters a low activity phase.

Another disadvantage of that solution is that its implementation has the potential to degrade the performance of an application, due to high transition costs (in time and/or in energy) between high-powered states and low-powered states. These costs may be non-linear relative to operating steps, and may vary from one network component to another. In contrast, the methods and mechanisms disclosed herein may advantageously account for non-linear transition costs while evaluating the feasibility of powering down the device, since the algorithms involved may merely trigger changes in the operating state when transition costs can be overlapped with significantly longer time-intervals of low network activity.

Yet another disadvantage of that solution is that its implementation may support only two operating modes: a first mode supporting full bandwidth with high power consumption, and a second mode supporting zero bandwidth with low power consumption. As a result, that solution cannot be adopted in hardware that caters to applications with varying percentage of network bandwidth demand. In contrast, the methods and mechanisms disclosed herein may advantageously support multiple degrees of network utilization, which may enable a device to fine-tune its power consumption based on application demand.

Still another disadvantage of that solution pertains to its applicability. Due to its inability to hide transition costs between the two operating states, it might only be adopted in systems with significantly low network utilization. In contrast, the methods and mechanisms disclosed herein may advantageously map varying network demands to different application phases, due to application-awareness and automated phase adaptation. This may in turn advantageously lead to power management at a finer granularity.

A further disadvantage of that solution is that while powering down a local network component, it may assume the absence of any network demand from external remote network components. In contrast, the methods and mechanisms disclosed herein may advantageously be capable of anticipating or forecasting local network activity based on both local demands as well as global demands. This may in turn boost confidence in activity estimates while tuning the local network component.

A major disadvantage of that solution is that it attempts to only address the issue of power consumed by a local network device. In contrast, the methods and mechanisms disclosed herein, in addition to saving power, may advantageously be capable of redirecting unused power from the network components toward other system components, thereby boosting application efficiency and/or system efficiency.

The methods and mechanisms disclosed herein may attain these advantages by incorporating various features: application awareness and phase adaptation; prediction of upcoming network activity; accounting for non-linear latency costs due to transitioning between multiple HFI operating states; accounting for backpressure for initiated by external remote network components; and/or accounting for both globally shared and job-local network components while steering power between fabric and compute-based system components Accordingly, disclosed herein are automated hierarchical feedback-driven control mechanisms and methods that operate at the system level as well as the job level. The mechanisms may begin with monitoring and aggregating dynamic network traffic, then predicting the occurrence and duration of future demands generated by system components executing a given application. A framework may then map this network demand to a corresponding operating mode (or state) of one or more local network devices, may trigger the devices to transition into the new mode, and may redirect the resultant power savings to other non-network system components (e.g., a Central Processing Unit (CPU), a storage unit, and so forth), thereby boosting performance (by improving system efficiency) and driving a recalibration of predictions of network activity.

Various components supporting these mechanisms and methods may include: a system-level power manager (SLPM); a job-level power manager (JLPM); a node-level power manager (NLPM); a fabric manager; a job manager; a network traffic monitor; a traffic aggregator; a traffic pattern detector; a frequency monitor of non-network system components; a frequency scaling agent for non-network system components; a bandwidth controller; a shared and node-local network device power state controller; and/or bandwidth-to-power state lookup tables.

For example, FIG. 1 illustrates an example operation flow, in accordance with some embodiments of the disclosure. Operation flow 100 may comprise various components and processes, and may encompass for example a node-level power manager 127, a system-level power manager 128, a job-level power manager 129, a fabric manager 130, and a user application 151.

The mechanisms and methods disclosed herein may support a first process-flow which may operate at a job level, and a second process-flow which may operate at a system level. At the job level, an application may execute using its allocated resources; activity on a network card (e.g., HFI, NIC, and/or HCA) may be monitored and predicted; whenever feasible, the network card may be switched into an operating state that corresponds to low power consumption; and a resulting drop in power may lead to more thermal headroom, and (if feasible) the power savings may be redirected toward other non-network components servicing the job, thereby advantageously boosting performance.

At the system level, at regular intervals, upon a centralized agent (e.g., a fabric manager) performing a complete sweep of the fabric and recording bandwidth utilization, the centralized agent may record an average power consumption (over a previous interval) by the globally shared network resources; the SLPM may find out from the centralized agent whether a change in power consumption is significant; the SLPM may then adjust values of an available system-wide power budget and/or reassign job budgets (possibly based on the site's policy); and the SLPM may communicate this adjustment directly to a JLPM and/or directly or indirectly to an NLPM.

The mechanisms and methods disclosed herein may support various processes, such as: a process for application phase detection; a process for activity tracking of job-local HFIs; a process for HFI state transitions; a process for activity tracking of globally shared network resources; a process for power steering from local HFIs to computational units; and/or a process for power steering from shared network resources toward a system budget pool.

Figure 2:
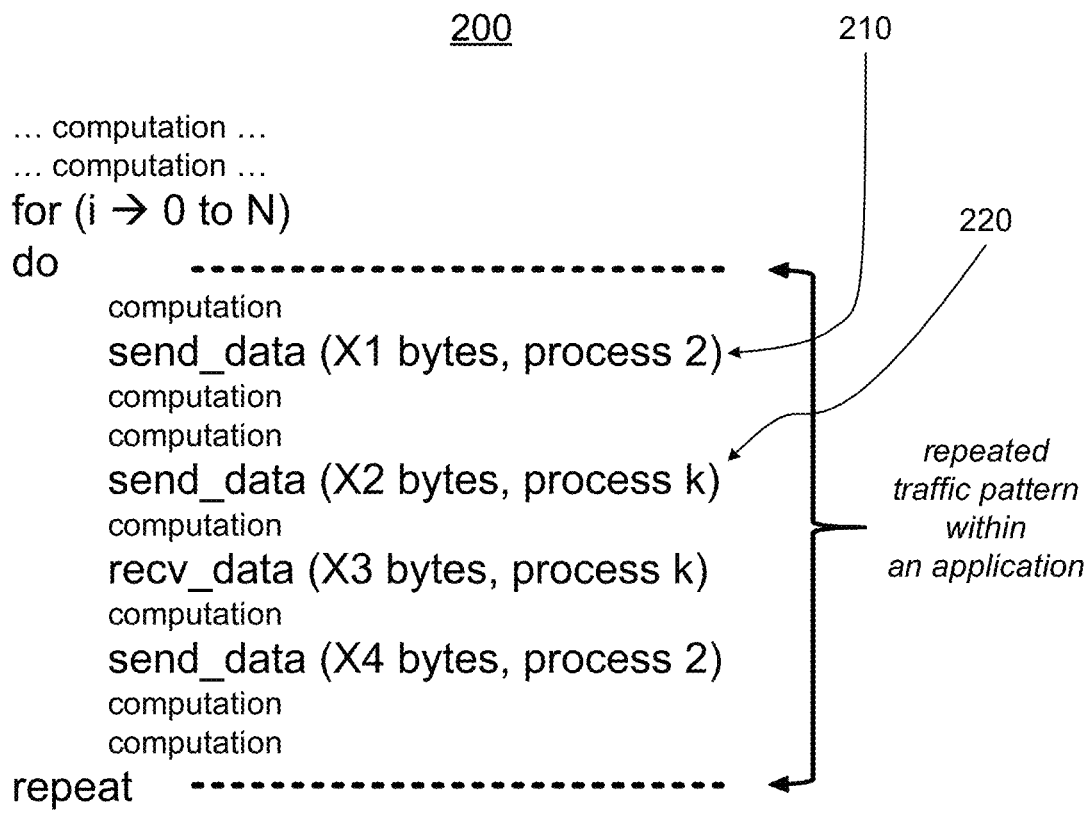
FIG. 2 illustrates a scenario of application phase detection, in accordance with some embodiments of the disclosure.

With respect to processes for application phase detection, FIG. 2 illustrates a scenario of application phase detection, in accordance with some embodiments of the disclosure. A scenario 200 may comprise execution of a code region 210 and a code region 220.

Large scale applications that target distributed computing systems may be characterized by code regions or code paths that may be executed multiple times (such code region 210 and code region 220). Within these code regions, a programmer may explicitly or implicitly initiate transfer of data payloads over a fabric, e.g. via an HFI. Accordingly, it may be desirable to accurately detect the boundaries of these regions.

The processes disclosed herein may involve detection of code regions by scanning and/or parsing a user application. This process may be automated, manual, or a combination of both.

Figure 3:
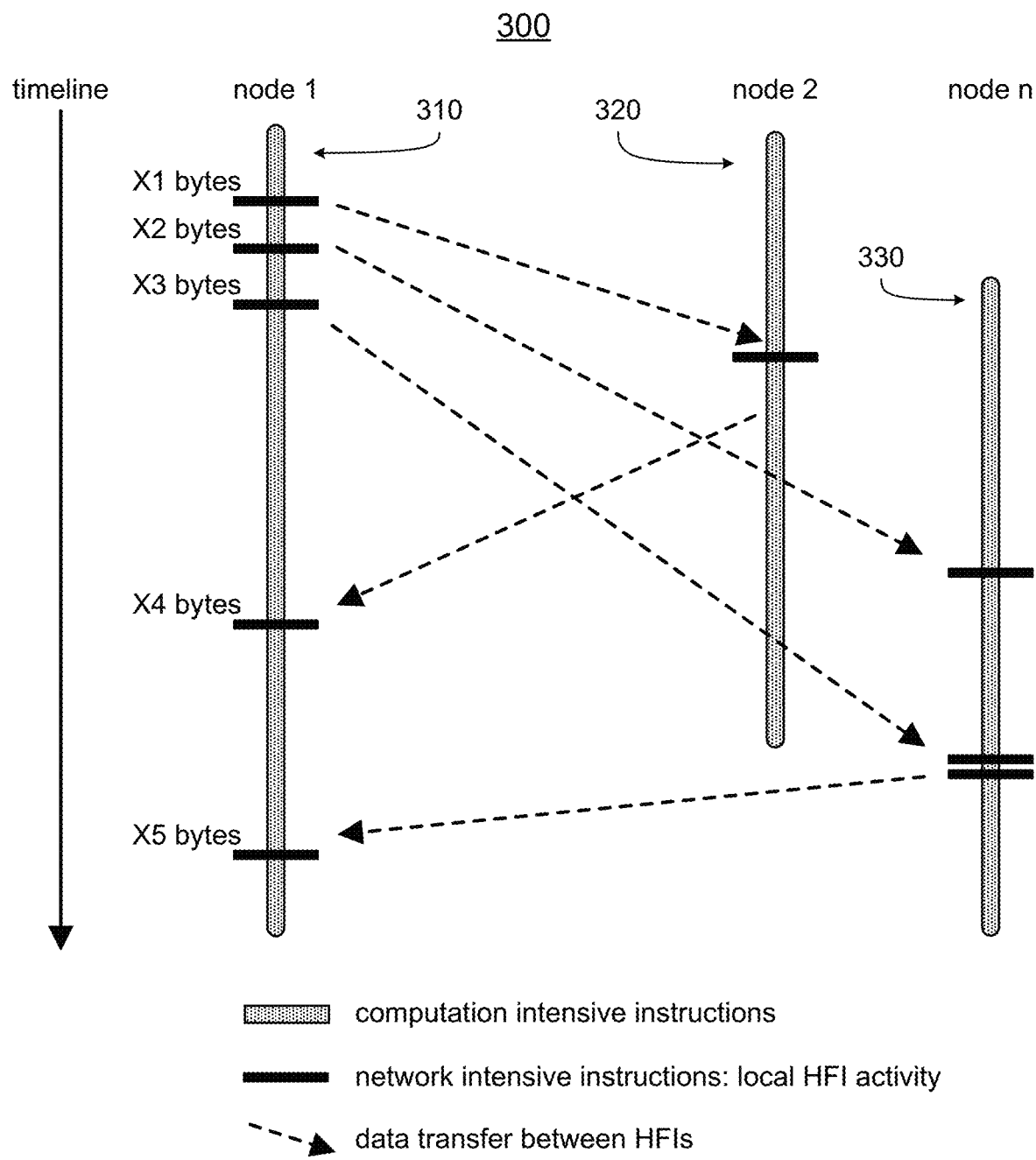
FIG. 3 illustrates a scenario of activity tracking of job-local HFIs, in accordance with some embodiments of the disclosure.

With respect to processes for activity tracking of job-local HFIs, FIG. 3 illustrates a scenario of activity tracking of job-local HFIs, in accordance with some embodiments of the disclosure. A scenario 300 may comprise data transfer between a first node 310, a second node 320, and so forth, through an Nth node 390.

Algorithms used within distributed applications may relate to transfer and exchange of data among compute nodes. For example, as depicted in FIG. 3, first node 310 may transfer X1 bytes to second node 320, first node 310 may transfer X2 bytes to Nth node 390, first node 310 may transfer X3 bytes to Nth node 390, second node 320 may transfer X4 bytes to first node 310, and Nth node 390 may transfer X5 bytes to first node 310. The size of the data being transferred and the rate of transfer may be dependent on a number of factors, such as the size of the computation, the physical distribution of the processes among the nodes, and so forth. Moreover, these properties may vary from one application phase to the next.

The processes disclosed herein may relate to a feedback-driven mechanism that keeps tracking and learning an HFI bandwidth demand for unique application phases. In addition to catering to data transfers initiated by one or more applications, a network device may also be responsible for transferring data packets that relate to a system-wide fabric manager as well as a communication stack (e.g., a system communication stack).

A fabric manager may be responsible for generating frequent management related packets at HFI ports. The communication stack may be responsible for generating packets related to various network protocols. The mechanisms and methods disclosed herein account for these packets as well, thereby increasing confidence levels during HFI traffic prediction.

Figure 4:
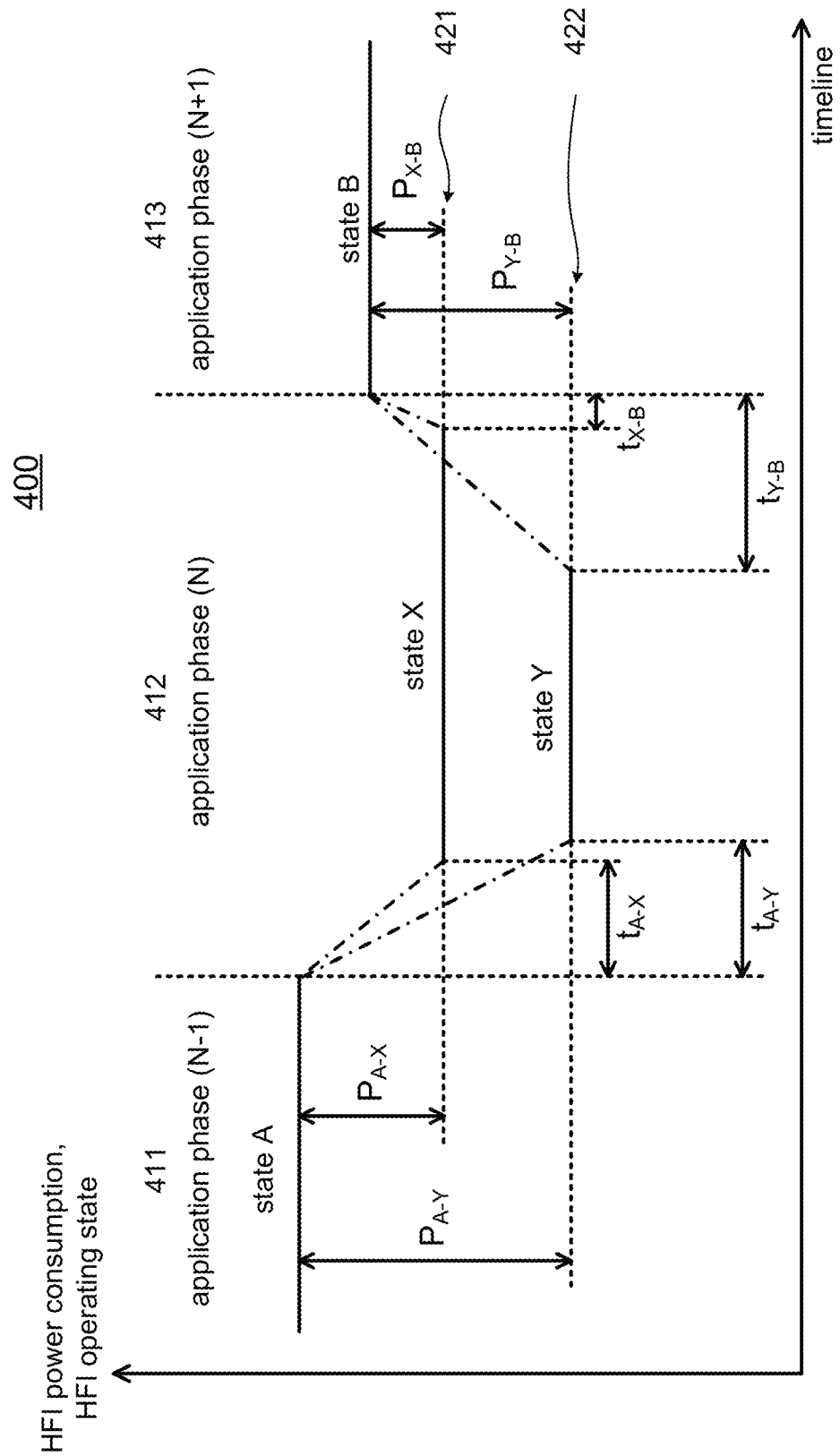
FIG. 4 illustrates a scenario of HFI state transitions, in accordance with some embodiments of the disclosure.

With respect to processes for HFI state transitions, FIG. 4 illustrates a scenario of HFI state transitions, in accordance with some embodiments of the disclosure. A scenario 400 depicts potential power consumption across an application phase 411, an application phase 412, and an application phase 413, and transitioning from an operating state A to an operating state B through a first operating state 421 and a second operating state 422.

The mechanisms and methods disclosed herein may anticipate future demands of a given application phase. Processes for HFI state transitions may relate to triggering an HFI to function at an operating state that consumes a minimum amount of power while still being capable of handling demands of the traffic. Notably, design constraints and deficiencies may lead to minimal, but non-negligible costs (e.g., in time) incurred while HFIs transition between any two operating states.

Operation at various states may correspond to different values of power consumption. The lower the power-value of a state, the higher the transition cost may be. For example, as depicted in FIG. 4, transitioning through operating state 422 may have a higher transition cost than transitioning through operating state 421. If these costs result in degradation of HFI performance, behavior of remote network devices may also be impacted (e.g., via backpressure). The mechanisms and methods disclosed herein may account for such costs while switching an HFI to a new operating state.

With respect to processes for activity tracking of globally shared network resources, such processes may relate to monitoring a dynamic bandwidth demand and a corresponding power consumption of various shared network resources within the fabric, up to and including all shared network resources within the fabric. Such resources may include switches that are connected to other switches, and compute nodes within the system.

For network components with large numbers of ports (e.g., director-class switches), a power delta between a typical power consumption and a maximum peak power consumption may be in the order of kilowatts. For example, for director class switches, the power delta may be from 1 kW to 3 kW. On detecting low-bandwidth demands during sufficiently long time intervals, redirecting these savings to one or more jobs may advantageously enable faster execution of applications, and thereby improve the throughput of job submission queues within the system.

With respect to processes for power steering from local HFIs to computational units, these processes may relate to the redirection of saved power from a powered-down HFI toward other computational units. In power-constrained systems where an entire compute node is expected to operate under a budget, redirecting power from some network components to other system components may advantageously boost application performance, increase power savings, and/or increase job efficiencies.

With respect to processes for power steering from shared network resources toward a system budget pool, such processes may relate to a redirection of a power budget (or a portion of a power budget) from globally-shared network resources to an SLPM. For example, the design of exascale computing systems may be constrained by their peak maximum power. Operating at such power constraints may make it desirable to efficiently use a total job-level and/or system-level power budget as enforced by a facility that hosts the machines.

Any reclaimed power from globally-shared network resources may be redirected toward specific fractions of a machine, which may be dictated by the design of the SLPM. For example, reclaimed power may be used to boost of the performance of high-priority applications and/or long-running applications, which in turn may lead to improvement in a throughput of an incoming job queue. Similarly, applications that are less sensitive to operating off of peak power may hand over excess power to the SLPM, and that portion of the power budget may then then be used either by other jobs or by the fabric itself.

Figure 5:
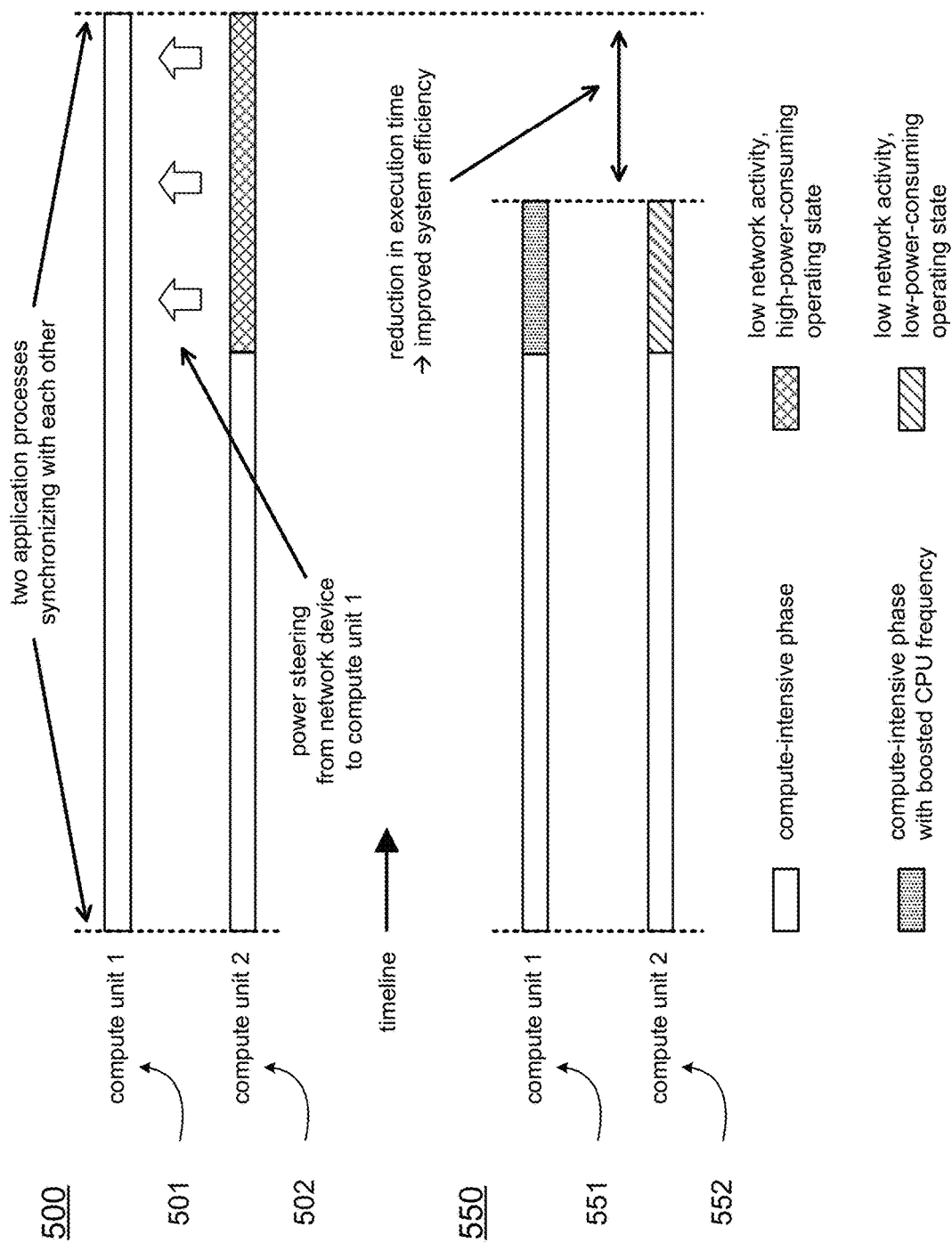
FIG. 5 illustrates scenarios of power steering from local HFIs to computational units, in accordance with some embodiments of the disclosure.

For example, FIG. 5 illustrates scenarios of power steering from local HFIs to computational units, in accordance with some embodiments of the disclosure. In a first scenario 500, processing in a first compute unit 501 and a second compute unit 502 have different compute-intensive phases, with second compute unit 502 having a phase with low network activity and/or high power consumption. In a second scenario 550, power may be steered away from a unit having a phase with low network activity and/or high power consumption. An execution time for a first compute unit 551 may then benefit from having a boosted CPU frequency, whereas an execution time for a second compute unit 552 may increase for a phase having low network activity and/or high power consumption. However, as a result of the power steering, an overall execution time may be less in second scenario 550 than in first scenario 500.

The mechanisms and methods disclosed herein may relate to various data structures, such as: an Operating State Lookup Table (OSLT); a State Transition Cost Table (STCT); an Application Phase Description Table (APDT); and/or a Job Power Budget Table (JPBT).

With respect to OSLTs, such data structures may relate to determining an HFI state that may be capable of handling a predicted demand. An entry in an OSLT may include an upper limit of a bandwidth supported at that state, and may include an expected power drop with respect to the state corresponding to maximum bandwidth, as shown in Table 1 below.

TABLE 1

Example contents of an Operating State Lookup Table

| HFI Operating State (OS) | Power Savings (PS) | Max supported Bandwidth (BW) |
|---|---|---|
| 1 | L1 | HFI_BW1 |
| 2 | L2 | HFI_BW2 |
| ... | ... | ... |
| n | Ln | HFI_BWn |

With respect to STCTs, such data structures may relate to accounting for costs for switching between HFI states. An HFI Power Manager (HPM) may use this data structure while choosing a preferred candidate. An entry in an STCT may include the costs incurred (e.g., in time) in transitioning from one state to another (e.g., from an initial state to a next state), as shown in Table 2 below.

TABLE 2

Example contents of a State Transition Cost Table (with "n" states)

| Initial State (IS) | Next State (NS) | Transition Cost (TC) |
|---|---|---|
| S1 | S1 | 0 |
| S1 | S2 | t1 |
| S1 | S3 | t2 |
| ... | ... | ... |
| Sn | Sn − 1 | tk |
| Sn | Sn | 0 |

With respect to APDTs, such data structures may support making decisions regarding the network demand of an application phase, for which it may be valuable to record traffic imposed upon the HFI during this phase. An entry in an APDT may correspond to a distinct phase within a user application. It may include a unique identifier, a description of the traffic pattern (e.g., a number of bytes transferred over a time interval), and an operating state of the HFI during its most recent execution, as shown in Table 3 below. It may also include a record of an ID of an application phase that is most likely to follow the current phase.

TABLE 3

Example contents of an Application Phase Description Table

| Application Phase ID | Bytes Transferred (B) | Execution Time (TW) | Most Recent HFI Operating State(OS) | Next Application Phase ID (NID) |
|---|---|---|---|---|
| 0x1 | 65536 | 60 ms | k | 0x3 |
| ... | ... | ... | ... | ... |

With respect to JPBTs, such data structures may support recording the power and/or frequency constraints of various job in the queue. An SLPM may maintain a JPBT. An entry in a JPBT may include a job-id, and may optionally include a priority, a power budget, a minimum operating frequency, a maximum operating frequency, and so forth, as shown in Table 4 below.

TABLE 4

Example contents of a Job Power Budget Table

| Job ID | Job Priority | Power Budget | Minimum CPU Frequency | Minimum CPU Frequency |
|---|---|---|---|---|
| 6534 | 2 | 500 W | 1.2 GHz | 2.3 GHz |

The mechanisms and methods disclosed herein may include various components interacting with each other in various ways, such as: components for application phase detection; components for tracking HFI activity; components for switching between HFI operating states; components for steering power savings from local HFIs toward computational units; and components for steering power savings from shared network resources toward a system budget pool.

Figure 6:
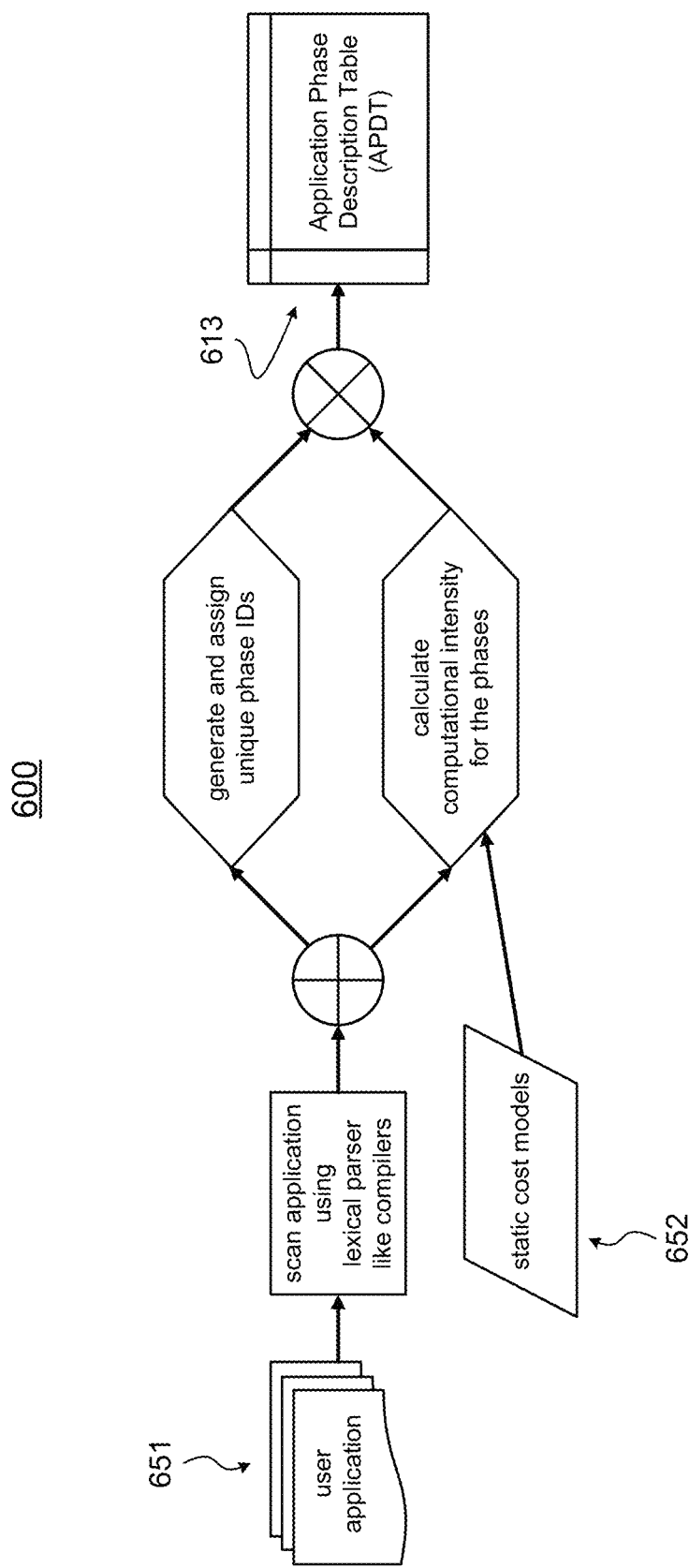
FIG. 6 illustrates example components for application phase detection, in accordance with some embodiments of the disclosure.

FIG. 6 illustrates example components for application phase detection, in accordance with some embodiments of the disclosure. A set of components 600 may comprise a user application 651, one or more cost models 652, and/or an APDT 613.

Identification of application phases (e.g., of user application 651) may be enabled by enhancing traditional lexical tools (e.g., compilers, linkers, and so forth) to parse user code and identify hints like programming constructs that may demarcate such regions (e.g., loop instructions, function calls, and so forth). Once the regions are detected, code-injection tools may be used to assign them unique identifiers and introduce signal generators at their boundaries. These generators may notify other components of the invention about the start and end of each application phase. This process may occur before or during the execution of the application. This phase may also optionally use cost models 652 (which may comprise static cost models) to determine whether the parsed code regions are compute-intensive or memory-intensive. Results of this phase may also be entered into APDT 613.

Figure 7:
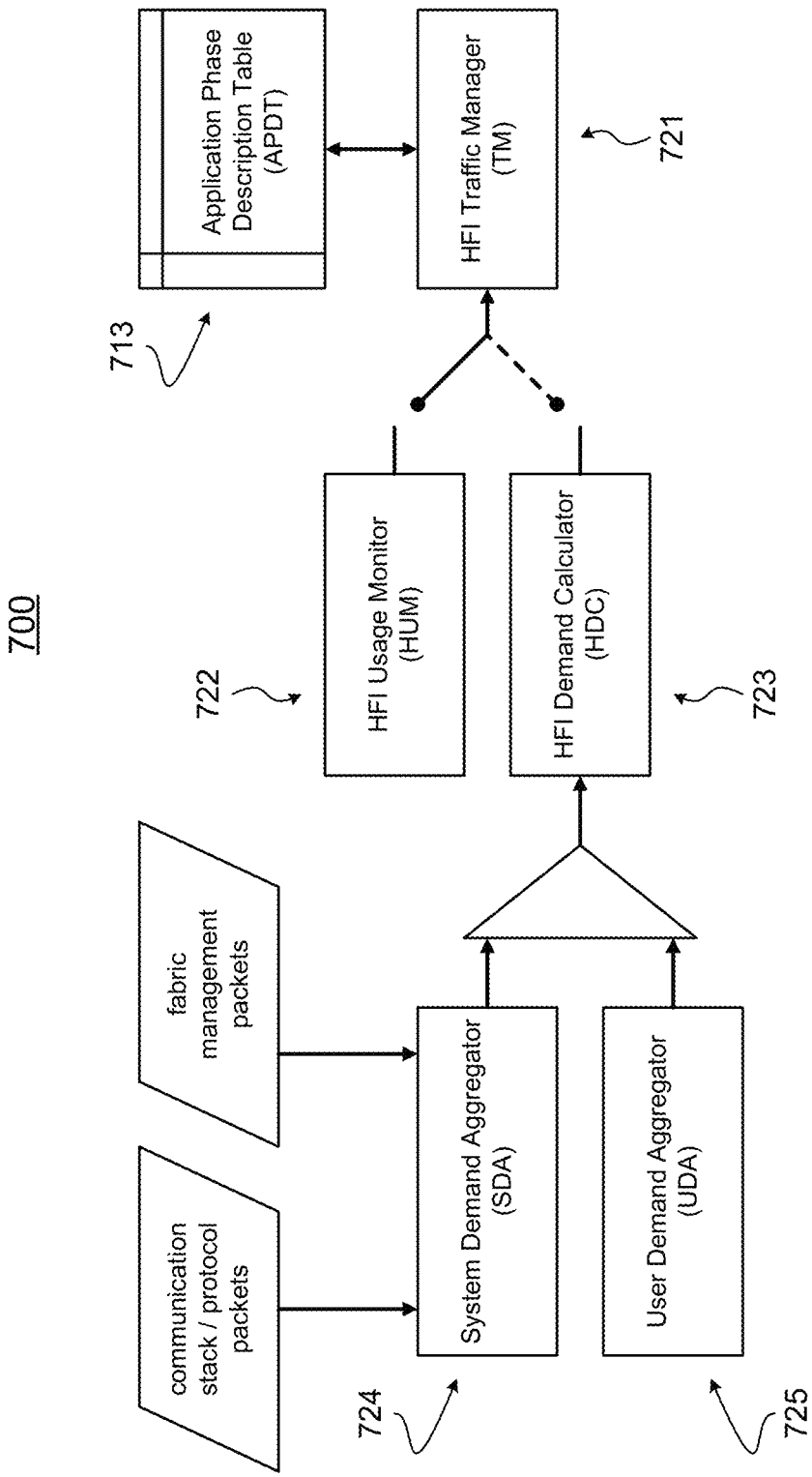
FIG. 7 illustrates example components for tracking HFI activity, in accordance with some embodiments of the disclosure.

FIG. 7 illustrates example components for tracking HFI activity, in accordance with some embodiments of the disclosure. A set of components 700 may comprise an HFI Traffic Manager (TM) 721, an HFI Usage Monitor (HUM) 722, an HFI Demand Calculator (HDC) 723, a User Demand Aggregator (UDA) 725, a System Demand Aggregator (SDA) 724, and/or an APDT 713.

HFI TM 721 may be responsible for recording network demand at an HFI during each application phase. In addition to accounting for traffic generated by an application, HFI TM 721 may also be responsible for accounting for traffic due to communication overhead with a fabric manager and a system communication stack.

For a given phase, HFI TM 721 may employ HUM 722 and/or HDC 723 to independently track HFI demand. HUM 722 may be responsible for counting incoming and outgoing network traffic observed at HFI ports. HDC 723 may be responsible for calculating incoming and outgoing network traffic imposed upon the HFI by a user application and a system stack (e.g., a system communication stack).

HDC 723 may communicate with two independent components: UDA 725 and SDA 724. UDA 725 may aggregate the total traffic imposed upon the HFI by multiple compute units, as coded into the user application. SDA 724 may be responsible for accounting for network management traffic generated either by the fabric manager or by a network stack manager during a given time-interval. This kind of traffic may depend on a number of external factors that lie outside the scope of a single node.

At the end of each application phase, HFI TM 721 may be responsible for collecting output from HUM 722 and HDC 723 to create an entry into an APDT 713. If an entry already exists, the last recorded values may be used for recalibration (e.g., by using statistical calculations such as running averages).

Figure 8:
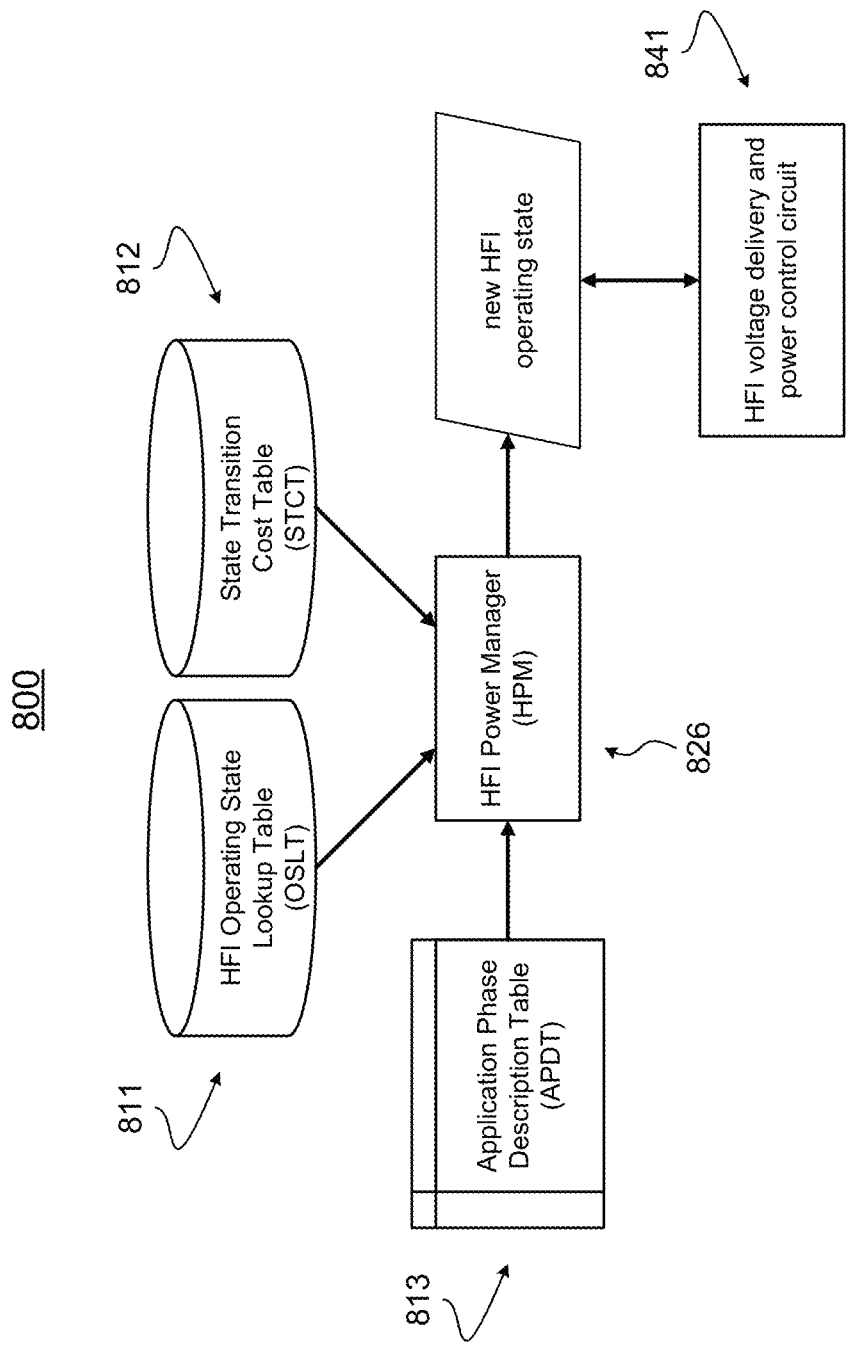
FIG. 8 illustrates example components for switching between HFI operating states, in accordance with some embodiments of the disclosure.

FIG. 8 illustrates example components for switching between HFI operating states, in accordance with some embodiments of the disclosure. A set of components 800 comprise an HPM 826, an STCT 812, an APDT 813, an OSLT 811, and/or a power delivery and voltage control circuitry 841.

An HPM 826 may be responsible for triggering a switch between operating states of an HFI. Since there may be a non-negligible transition cost (e.g., in time) between operating states, HPM 826 may account for this cost before deciding to initiate a state switch, so that lowering of the performance of the HFI may not negatively impact performance of the application (e.g., due to delays in execution of the consecutive phases) and/or performance of remote network devices in the fabric (e.g., due to backpressure of incoming traffic and/or outgoing traffic).

The HPM may obtain transition cost information from an STCT 812 and may obtain information about the execution of past phases and upcoming phases from an APDT 813. The HPM may then select an ideal operating state (e.g., for the HFI) from an OSLT 813. It may then communicate with a power delivery and voltage control circuit 841 within the HFI to set it to a new operating state.

Figure 9:
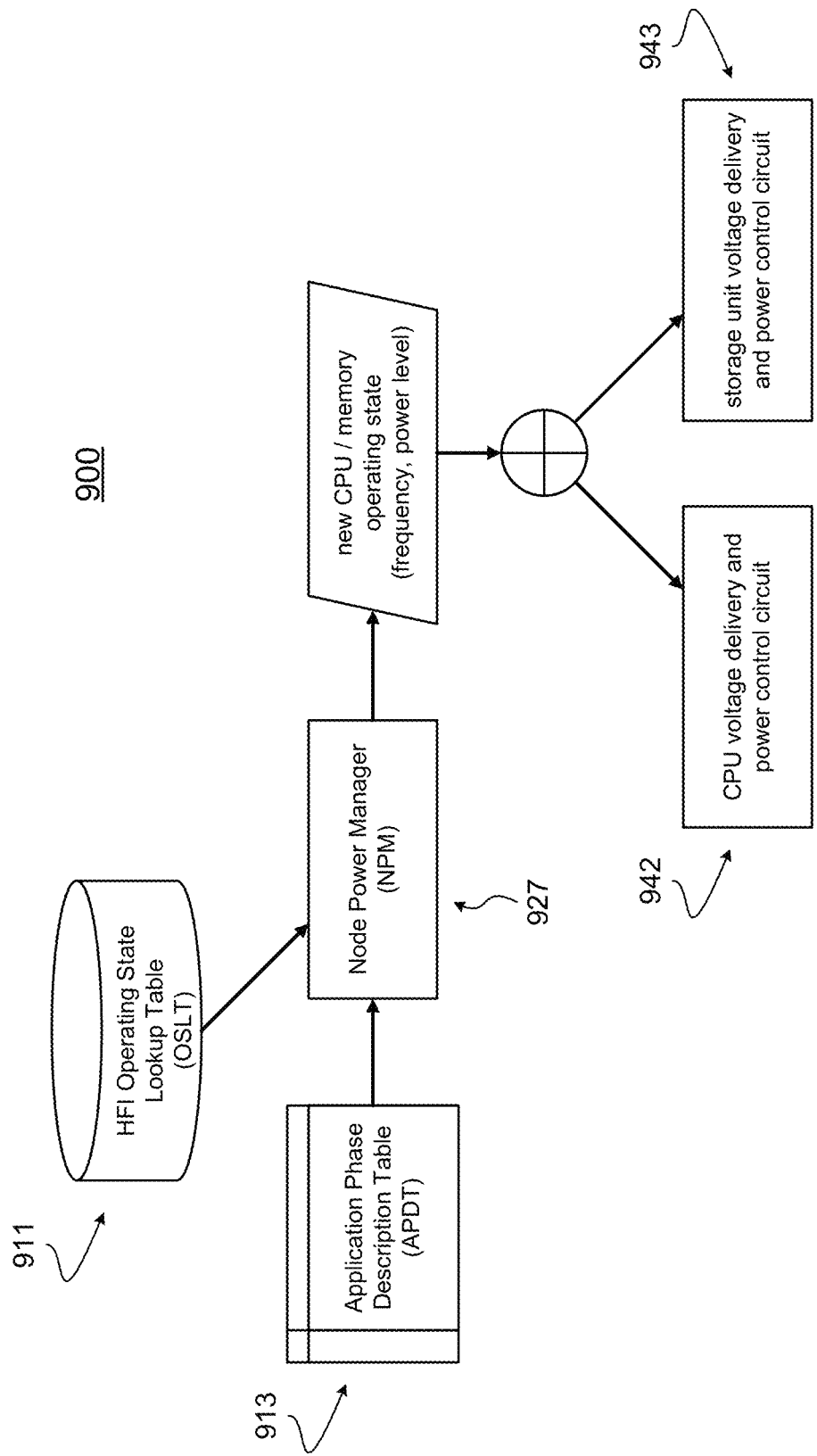
FIG. 9 illustrates steering power savings from local HFIs to computational units, in accordance with some embodiments of the disclosure.

FIG. 9 illustrates steering power savings from local HFIs to computational units, in accordance with some embodiments of the disclosure. A set of components 900 may comprise a Node Power Manager (NPM) 927 (which may be a Node-Level Power Manager), an APDT 913, an OSLT 911, a CPU voltage delivery and power control circuitry 942, and/or a storage unit voltage delivery and power control circuit 943.

NPM 927 may be responsible for redirecting power saved by an HFI toward other system components, which may include computational units and/or storage units. Additional power may be distributed to either, depending on whether a corresponding application phase is memory-intensive or compute-intensive. An APDT 913 may be expanded to hold additional metrics that may aid in categorizing the intensity.

NPM 927 may refer to an OSLT 911 to determine an amount of power that may be redirected from the HFI toward the other system components. NPM 927 may trigger a boost in performance via a power supply circuit, a voltage supply circuit, and/or a frequency control circuitry (e.g., a CPU voltage delivery and power control circuitry 942 and/or a storage unit voltage delivery and power control circuit 943). Additionally, if NPM 927 detects that an application is consuming lower power than that allocated by an SLPM, it may also communicate the power savings to the SLPM for reclamation into a total system power budget available for future allocation.

Figure 10:
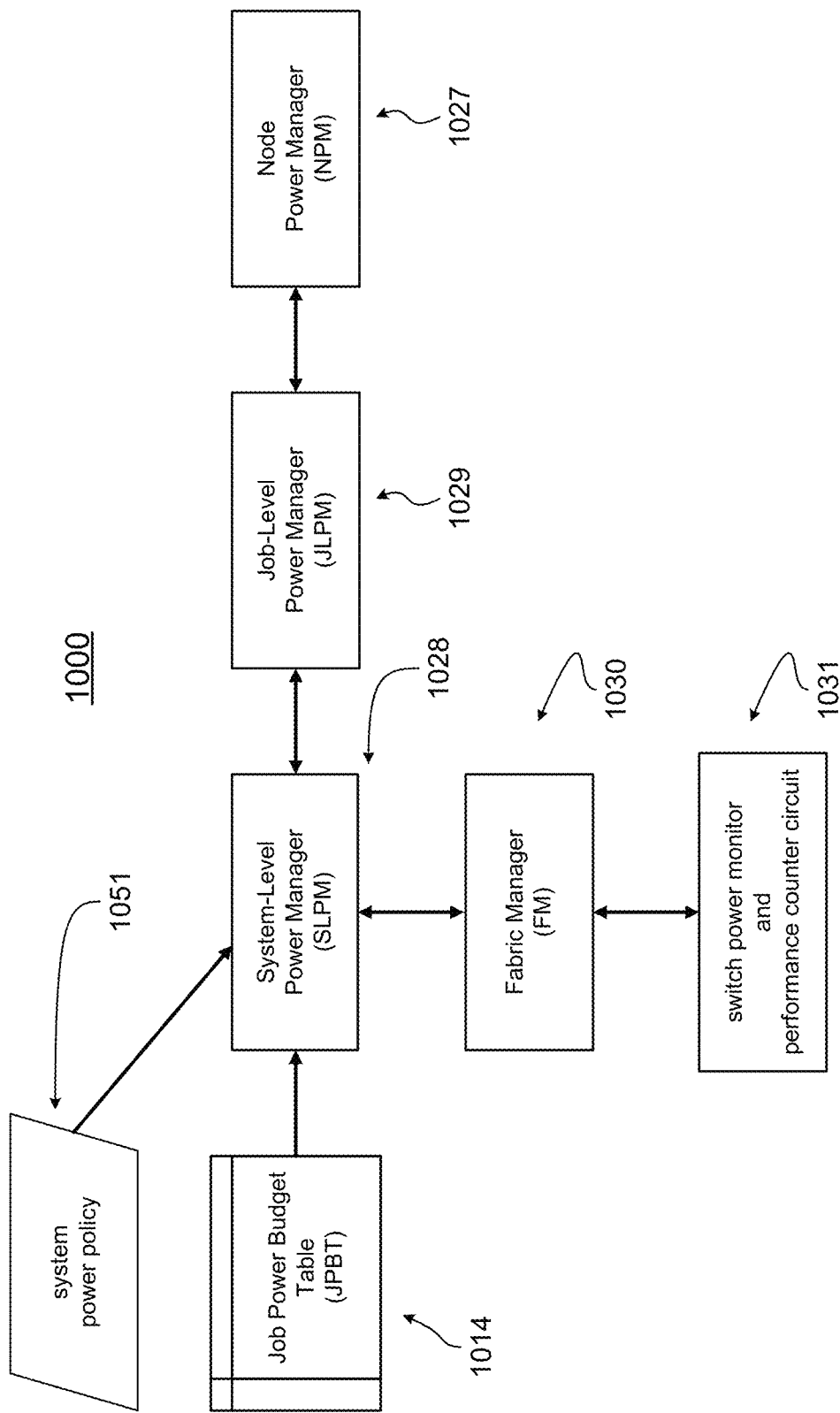
FIG. 10 illustrates example components for steering power savings from shared network resources to a system budget pool, in accordance with some embodiments of the disclosure.

FIG. 10 illustrates example components for steering power savings from shared network resources to a system budget pool, in accordance with some embodiments of the disclosure. A set of components 1000 may comprise an SLPM 1028, a JLPM 1029, an NPM 1027, a fabric manager FM 1030, and/or a switch power monitor and performance counter circuit 1031.

SLPM 1028 may be responsible for steering power among shared network resources and job allocations (e.g., via JLPM 1029 and/or NPM 1027). It may maintain a record of power constraints assigned to each job (e.g., via a JPBT 1014). These constraints may be either determined during job launch or predetermined via a system power policy 1051.

SLPM 1028 may be capable of receiving feedback in terms of the total power consumed by the fabric. This information may be provided at regular intervals by FM 1030, which may in turn interact with power counters and/or performance counters on shared network resources (e.g., switch power monitor and performance counter circuit 1031). If a total power consumed is detected to be lower that a peak fabric power, the difference may be added into the pool of available power budget for future job allocations.

The mechanisms and methods disclosed herein may support algorithms that operate at various times, such as: at the end of a recently-executed application phase $P_{PREV}$; at the start of an upcoming application phase $P_{CURRENT}$ that immediately follows $P_{PREV}$; or during execution of the phase $P_{CURRENT}$.

With respect to operation at the end of a recently-executed application phase $P_{PREV}$, an HFI TM may refer to an HUM, an HDC, or both to collect information including: bytes transferred (B); execution time window (TW); and HFI operating state (OS). The HFI TM may store these into an APDT:

$APDT(P_{PREV}) \leftarrow \{B_{PREV\_RECORDED}, TW_{PREV\_RECORDED}, OS_{PREV\_RECORDED}\}$ With respect to operation at the start of an upcoming application phase $P_{CURRENT}$ that immediately follows $P_{PREV}$, in a first step, an HPM may record $P_{CURRENT}$ as being the succeeding phase to $P_{PREV}$ (e.g., into a succeeding phase ID (NID) of an APDT):

$APDT(P_{PREV}).NID \leftarrow P_{CURRENT}$

In a second step, the HPM may read the APDT to calculate an expected average bandwidth of $P_{CURRENT}$ (e.g., based on B and TW):

$$BW_{CURRENT} = APDT(P_{CURRENT}) \cdot B / APDT(P_{CURRENT}) \cdot TW$$

In a third step, the HPM may read the APDT to get its own NID:

$P_{NEXT} \leftarrow APDT(P_{CURRENT}) \cdot NID$

In a fourth step, the HPM may begin a search for a desirable operating state for the HFI during the execution of the upcoming phase $P_{CURRENT}$. The HPM may read the APDT to get a previous-phase OS and a next-phase OS:

$OS_{PREV} \leftarrow APDT(P_{PREV}) \cdot OS$
$OS_{NEXT} \leftarrow APDT(P_{NEXT}) \cdot OS$ The HPM may repeat this for each OS ("$OS_{TEMP}$") in the OSLT.

$OS_{TEMP} \leftarrow 0$
start loop
$OS_{TEMP} \leftarrow OS_{TEMP} + 1$

The HPM may read an STCT to get transition costs (TC) for switching from $OS_{PREV}$ to $OS_{TEMP}$, and for switching from $OS_{TEMP}$ to $OS_{NEXT}$ $T_{ENTRY} \leftarrow STCT(OS_{PREV}, OS_{TEMP}) \cdot TC$
$T_{EXIT} \leftarrow STCT(OS_{TEMP}, OS_{NEXT}) \cdot TC$ The HPM may then determine whether average of the transition costs is much greater than a current TW, and also whether a BW for the $OS_{TEMP}$ in the OSLT is less than a current BW. While both are true, the HPM may then return to the start of the loop; else the HPM may exit the loop.

if $[(T_{ENTRY} + T_{EXIT})/2 \gg TW_{CURRENT}]$ AND $[OSLT(OS_{TEMP}).BW < BW_{CURRENT}]$
   continue: go to start of loop
else
   stop: exit loop
endif
end loop
$OS_{CURRENT} \leftarrow OS_{TEMP} - 1$ In a fifth step, the HFI may be set to a new state $OS_{CURRENT}$ and may update the APDT to reflect this change.

$APDT(P_{CURRENT}).OS \leftarrow OS_{CURRENT}$

With respect to operation during execution of the phase $P_{CURRENT}$, an HDC may calculate a total network pressure imposed upon the HFI by the user application (e.g., in terms of bytes transmitted and/or received), the system communication stack, and the fabric manager. An HFI Demand Monitor (HDM) may monitor HFI ports to read the traffic flow (e.g., in terms of bytes).

$B_{CURRENT} \leftarrow B_{USER\_APPLICATION} + B_{FABRIC\_MANAGEMENT} + B_{SYSTEM\_COMMUNCIATION\_STACK}$ Both the HDC and the HDM may pass this information to the TM at the end of the application phase $P_{CURRENT}$.

The NPM may read the HFI OSLT to determine the extent of power savings achievable for the current HFI state $OS_{CURRENT}$. The NPM may then distribute this power to other system components depending on the computational intensity of the corresponding phase.

Figure 11:
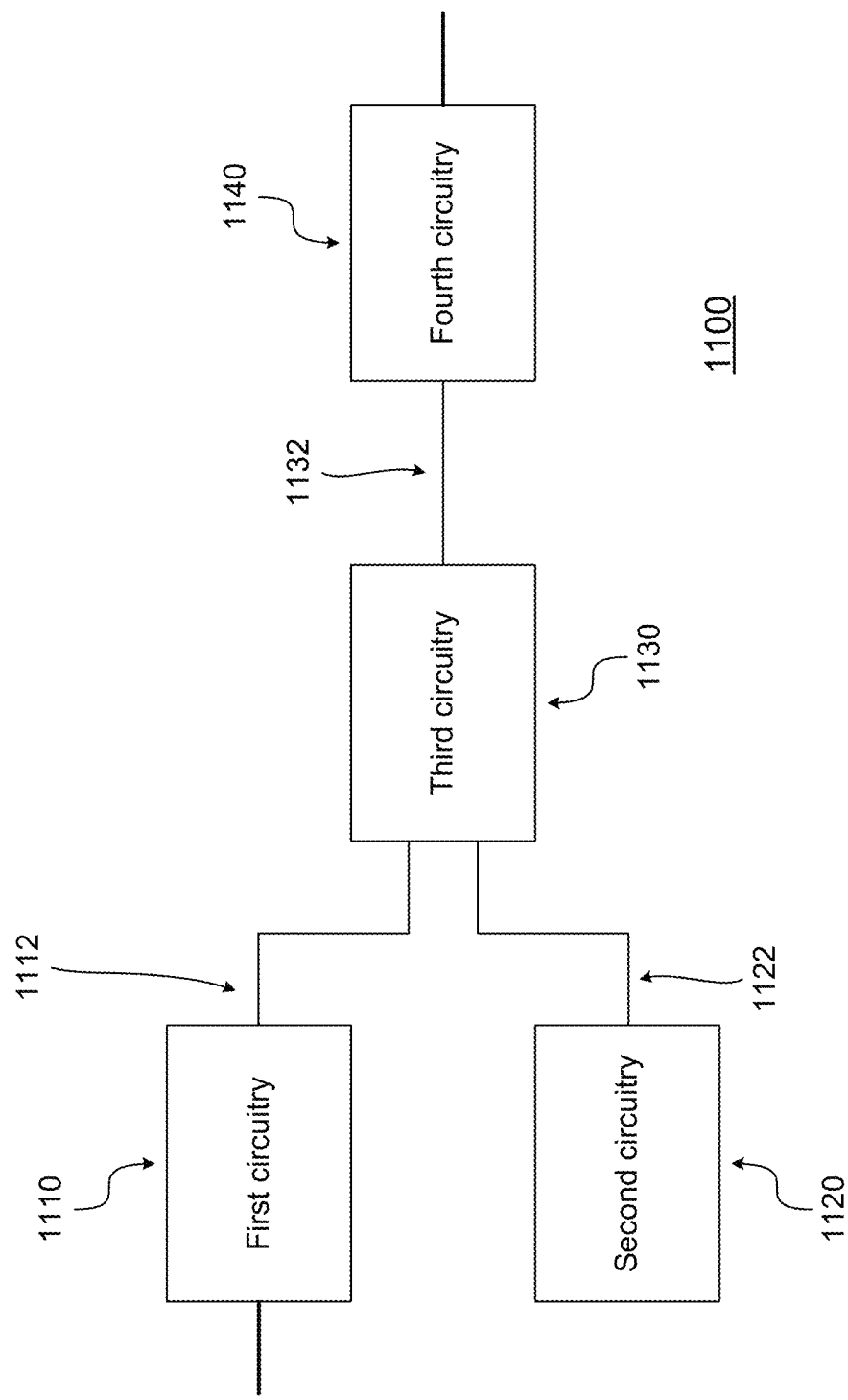
FIG. 11 illustrates circuitries for automated hierarchical feedback-driven control mechanisms, in accordance with some embodiments of the disclosure.

FIG. 11 illustrates circuitries for automated hierarchical feedback-driven control mechanisms, in accordance with some embodiments of the disclosure. A design 1100 may comprise a first circuitry 1110, a second circuitry 1120, and a third circuitry 1130. First circuitry 1110 may be operable to receive a system operating characteristic guidance. Second circuitry 1120 may be operable to provide one or more manufacturing characteristics. Third circuitry 1130 may be operable to store one or more system operating characteristics based upon the system operating characteristic guidance and the one or more manufacturing characteristics. First circuitry 1110 may be operable to provide information regarding the system operating characteristic guidance to third circuitry 1130 via an interface 1112, and second circuitry 1120 may be operable to provide information regarding the manufacturing characteristics to third circuitry 1130 via an interface 1122.

In some embodiments, design 1100 may comprise one or more respectively corresponding memory storage elements to store the one or more manufacturing characteristics. For some embodiments, the system operating characteristic guidance may include a hardware frequency guidance, a network bandwidth guidance, a network message rate guidance, and/or a register-state guidance.

In some embodiments, the system operating characteristic guidance may be from a job local power management device (e.g., any of a number of local components, including a CPU or a network, for example). For some embodiments, the system operating characteristic guidance may include guidance for a job level power manager hardware and/or a job level power manager hardware firmware. For some embodiments, the system operating characteristic guidance may originate from local actors, and in some embodiments, the system operating characteristic guidance may originate from a centralized system-level element (e.g., a fabric manager).

For some embodiments, the design may comprise one or more outputs may provide the one or more system operating characteristics. In some embodiments, the design may comprise one or more inputs to receive the system operating characteristic guidance.

In some embodiments, design 1100 may comprise a fourth circuitry 1140 to output, based upon the one or more system operating characteristics, a modification indicator for a hardware frequency, a network bandwidth, a message rate, and/or a register state. Third circuitry may provide information regarding the system operating characteristics to fourth circuitry 1140 via an interface 1132. For some embodiments, the one or more system operating characteristics may be additionally based upon one or more current state characteristics and/or one or more future state characteristics. In some embodiments, the one or more system operating characteristics may be additionally based upon one or more network back-pressure characteristics.

Figure 12:
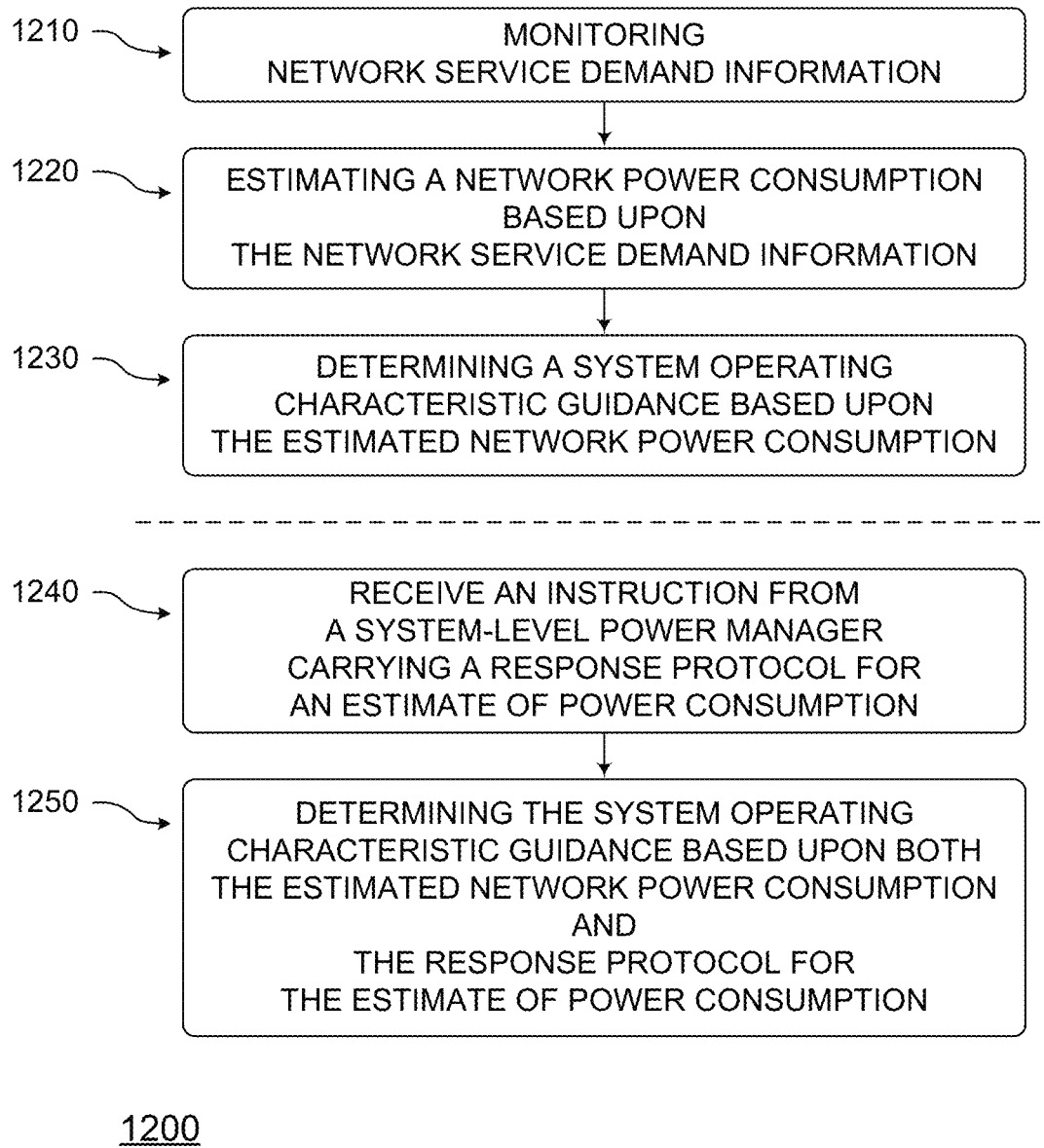
FIGS. 12-13 illustrates methods for automated hierarchical feedback-driven control mechanisms, in accordance with some embodiments of the disclosure.
Figure 13:
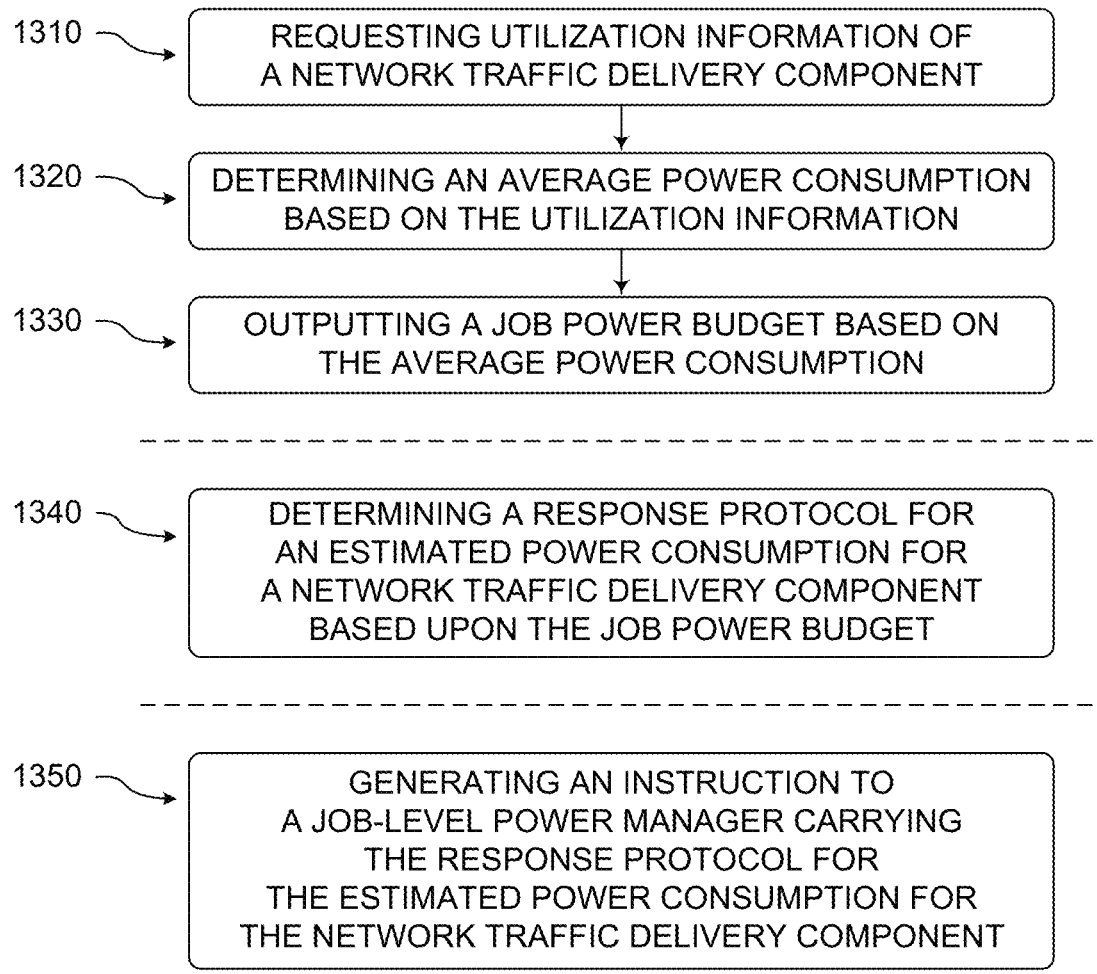

FIGS. 12-13 illustrates methods for automated hierarchical feedback-driven control mechanisms, in accordance with some embodiments of the disclosure. With respect to FIG. 12, a method 1200 may comprise a monitoring 1210, an estimating 1220, and a determining 1230. In some embodiments, method 1240 may comprise a receiving 1240 and/or a determining 1250.

In monitoring 1210, a network service demand information may be monitored. In estimating 1220, a network power consumption may be estimated based upon the network service demand information. In determining 1230, a system operating characteristic guidance may be determined based upon the estimated network power consumption. For some embodiments, the system operating characteristic guidance may pertain to a local network card, and for some embodiments, the system operating characteristic guidance may pertain to network components external to the computer system servicing a specific user application (e.g. shared network resources like switches and/or network cards servicing other user applications).

In some embodiments, the network service demand information may include hardware monitoring data (e.g., a bandwidth and/or an information rate). For some embodiments, the network service demand information may include software monitoring data.

In some embodiments, the network service demand information may include values from one or more network traffic delivery counters. In various embodiments, the network traffic delivery counters may be local to a component on which a user application or job is running (e.g., a CPU, or a network card). In various embodiments, the network traffic delivery counters may reside with a centralized fabric manager remote from the computer system on which a user application or job is running.

For some embodiments, in receiving 1240, an instruction may be received from a system-level power manager carrying a response protocol for an estimate of power consumption. In some embodiments, in determining 1250, the system operating characteristic guidance may be determined based upon both the estimated network power consumption, and the response protocol for the estimate of power consumption.

In some embodiments, the network service demand information may include application monitoring data and/or an application-provided guidance. For some embodiments, the network service demand information may include guidance provided by a centralized system-level fabric manager.

For some embodiments, wherein the network service demand information includes a network bandwidth and/or a network message rate. In various embodiments, the network service demand information may originate from a user application or job. In various embodiments, the network service demand information may originate from an external device, such as a switch (e.g., as network back-pressure).

With respect to FIG. 13, a method 1300 may comprise a requesting 1310, a determining 1320, and an outputting 1330. In some embodiments, method 1300 may comprise a determining 1340 and/or a generating 1350.

In requesting 1310, utilization information of a network traffic delivery component may be requested. In determining 1320, an average power consumption based on the utilization information may be determined. In outputting 1330, a job power budget based on the average power consumption may be outputted.

In some embodiments, the average power consumption based on the utilization information may be calculated based upon the utilization information of the network traffic delivery component. In various embodiments, the utilization information may also be calculated based on traffic information and/or hints provided by centralized system-level fabric manager. For some embodiments, the average power consumption based on the utilization information may be provided by the network traffic delivery component.

In some embodiments, in determining 1340, a response protocol for an estimated power consumption for a network traffic delivery component may be determined, based upon the job power budget. For some embodiments, the response protocol for the estimated power consumption for the network traffic delivery component may include a hardware frequency protocol, a network bandwidth protocol, a network message rate protocol, and/or a register-state protocol.

For some embodiments, in generating 1350, an instruction to a job-level power manager carrying the response protocol for the estimated power consumption for the network traffic delivery component may be generated.

Although the actions in the flowchart with reference to FIGS. 12-13 are shown in a particular order, the order of the actions can be modified. Thus, the illustrated embodiments can be performed in a different order, and some actions may be performed in parallel. Some of the actions and/or operations listed in FIGS. 12-13 are optional in accordance with certain embodiments. The numbering of the actions presented is for the sake of clarity and is not intended to prescribe an order of operations in which the various actions must occur. Additionally, operations from the various flows may be utilized in a variety of combinations.

In some embodiments, an apparatus may comprise means for performing various actions and/or operations of the methods of FIGS. 12-13.

Moreover, in some embodiments, machine readable storage media may have executable instructions that, when executed, cause one or more processors to perform an operation comprising a method of FIGS. 12-13. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

Figure 14:
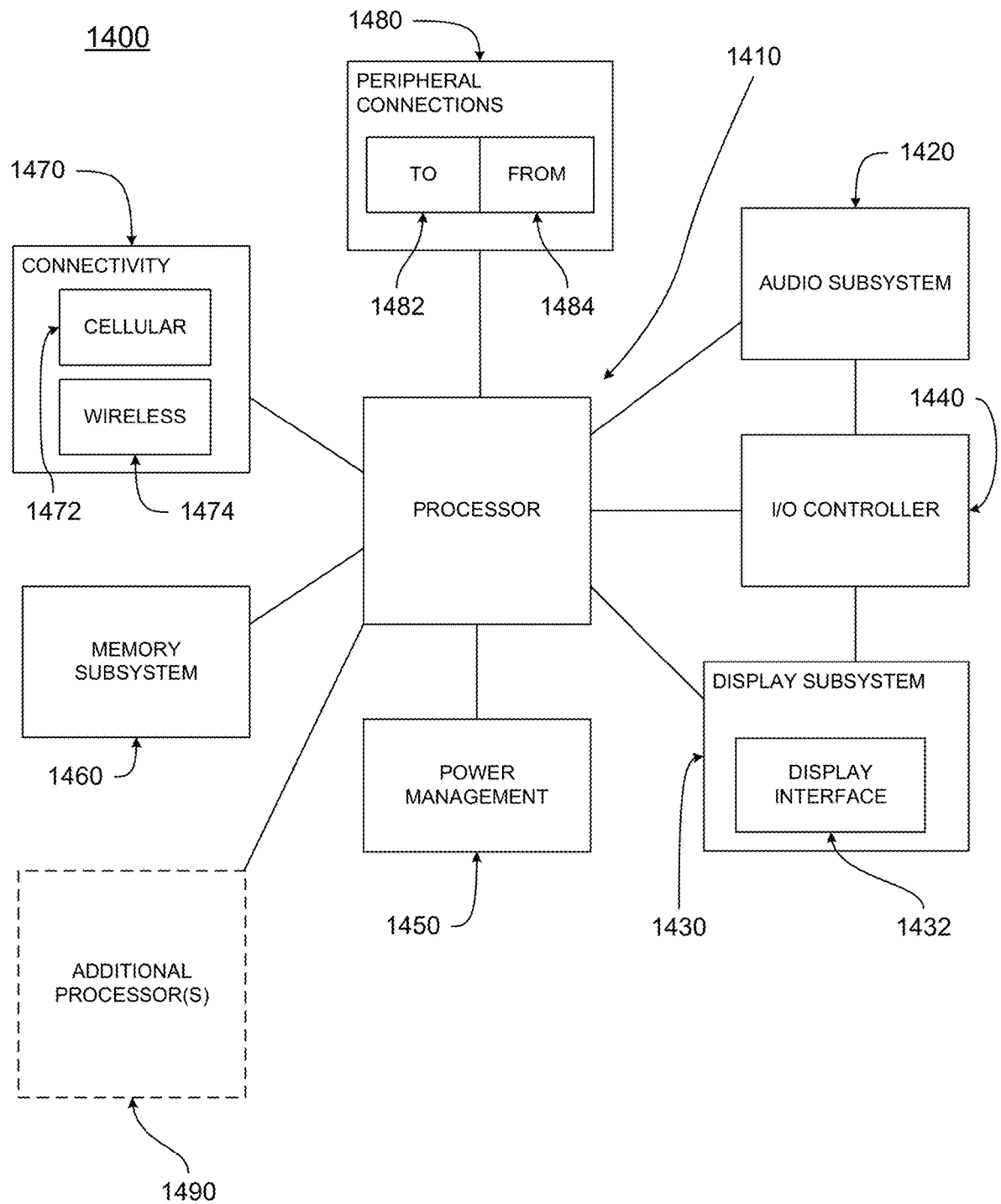
FIG. 14 illustrates a computing device implementing mechanisms and methods for automated hierarchical feedback-driven control, in accordance with some embodiments of the disclosure.

FIG. 14 illustrates a computing device implementing mechanisms and methods for automated hierarchical feedback-driven control, in accordance with some embodiments of the disclosure. Computing device 1400 may be e.g.: a server, a computer system, a System-on-a-Chip (SoC), a tablet, a mobile device, a smart device, or a smart phone with mechanisms for automated hierarchical feedback-driven control mechanisms, in accordance with some embodiments of the disclosure. It will be understood that certain components of computing device 1400 are shown generally, and not all components of such a device are shown FIG. 14. Moreover, while some of the components may be physically separate, others may be integrated within the same physical package, or even on the same physical silicon die. Accordingly, the separation between the various components as depicted in FIG. 14 may not be physical in some cases, but may instead be a functional separation. It is also pointed out that those elements of FIG. 14 having the same names or reference numbers as the elements of any other figure can operate or function in any manner similar to that described, but are not limited to such.

In various embodiments, the components of computing device 1400 may include any of a processor 1410, an audio subsystem 1420, a display subsystem 1430, an I/O controller 1440, a power management component 1450, a memory subsystem 1460, a connectivity component 1470, one or more peripheral connections 1480, and one or more additional processors 1490. In some embodiments, processor 1410 may implement mechanisms and methods for automated hierarchical feedback-driven control, in accordance with some embodiments of the disclosure. In various embodiments, however, any of the components of computing device 1400 may implement, in accordance with some embodiments of the disclosure. In addition, one or more components of computing device 1400 may include an interconnect fabric having a plurality of ports, such as a router, a network of routers, or a Network-on-a-Chip (NoC).

In some embodiments, computing device 1400 may be a mobile device which may be operable to use flat surface interface connectors. In one embodiment, computing device 1400 may be a mobile computing device, such as a computing tablet, a mobile phone or smart-phone, a wireless-enabled e-reader, or other wireless mobile device. The various embodiments of the present disclosure may also comprise a network interface within 1470 such as a wireless interface so that a system embodiment may be incorporated into a wireless device, for example a cell phone or personal digital assistant.

Processor 1410 may be a general-purpose processor or CPU (Central Processing Unit). In some embodiments, processor 1410 may include one or more physical devices, such as microprocessors, application processors, microcontrollers, programmable logic devices, or other processing means. The processing operations performed by processor 1410 may include the execution of an operating platform or operating system on which applications and/or device functions may then be executed. The processing operations may also include operations related to one or more of the following: audio I/O; display I/O; power management; connecting computing device 1400 to another device; and/or I/O (input/output) with a human user or with other devices.

Audio subsystem 1420 may include hardware components (e.g., audio hardware and audio circuits) and software components (e.g., drivers and/or codecs) associated with providing audio functions to computing device 1400. Audio functions can include speaker and/or headphone output as well as microphone input. Devices for such functions can be integrated into computing device 1400, or connected to computing device 1400. In one embodiment, a user interacts with computing device 1400 by providing audio commands that are received and processed by processor 1410.

Display subsystem 1430 may include hardware components (e.g., display devices) and software components (e.g., drivers) that provide a visual and/or tactile display for a user to interact with computing device 1400. Display subsystem 1430 may include a display interface 1432, which may be a particular screen or hardware device used to provide a display to a user. In one embodiment, display interface 1432 includes logic separate from processor 1410 to perform at least some processing related to the display. In some embodiments, display subsystem 1430 includes a touch screen (or touch pad) device that provides both output and input to a user.

I/O controller 1440 may include hardware devices and software components related to interaction with a user. I/O controller 1440 may be operable to manage hardware that is part of audio subsystem 1420 and/or display subsystem 1430. Additionally, I/O controller 1440 may be a connection point for additional devices that connect to computing device 1400, through which a user might interact with the system. For example, devices that can be attached to computing device 1400 might include microphone devices, speaker or stereo systems, video systems or other display devices, keyboard or keypad devices, or other I/O devices for use with specific applications such as card readers or other devices.

As mentioned above, I/O controller 1440 can interact with audio subsystem 1420 and/or display subsystem 1430. For example, input through a microphone or other audio device can provide input or commands for one or more applications or functions of computing device 1400. Additionally, audio output can be provided instead of, or in addition to, display output. In another example, if display subsystem 1430 includes a touch screen, the display device may also act as an input device, which can be at least partially managed by I/O controller 1440. There can also be additional buttons or switches on computing device 1400 to provide I/O functions managed by I/O controller 1440.

In some embodiments, I/O controller 1440 manages devices such as accelerometers, cameras, light sensors or other environmental sensors, or other hardware that can be included in computing device 1400. The input can be part of direct user interaction, and may provide environmental input to the system to influence its operations (such as filtering for noise, adjusting displays for brightness detection, applying a flash for a camera, or other features).

Power management component 1450 may include hardware components (e.g., power management devices and/or circuitry) and software components (e.g., drivers and/or firmware) associated with managing battery power usage, battery charging, and features related to power saving operation.

Memory subsystem 1460 may include one or more memory devices for storing information in computing device 1400. Memory subsystem 1460 can include nonvolatile memory devices (whose state does not change if power to the memory device is interrupted) and/or volatile memory devices (whose state is indeterminate if power to the memory device is interrupted). Memory subsystem 1460 can store application data, user data, music, photos, documents, or other data, as well as system data (whether long-term or temporary) related to the execution of the applications and functions of computing device 1400.

Some portion of memory subsystem 1460 may also be provided as a non-transitory machine-readable medium for storing the computer-executable instructions (e.g., instructions to implement any other processes discussed herein). The machine-readable medium may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, some embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity component 1470 may include a network interface, such as a cellular interface 1472 or a wireless interface 1474 (so that an embodiment of computing device 1400 may be incorporated into a wireless device such as a cellular phone or a personal digital assistant). In some embodiments, connectivity component 1470 includes hardware devices (e.g., wireless and/or wired connectors and communication hardware) and software components (e.g., drivers and/or protocol stacks) to enable computing device 1400 to communicate with external devices. Computing device 1400 could include separate devices, such as other computing devices, wireless access points or base stations, as well as peripherals such as headsets, printers, or other devices.

In some embodiments, connectivity component 1470 can include multiple different types of network interfaces, such as one or more wireless interfaces for allowing processor 1410 to communicate with another device. To generalize, computing device 1400 is illustrated with cellular interface 1472 and wireless interface 1474. Cellular interface 1472 refers generally to wireless interfaces to cellular networks provided by cellular network carriers, such as provided via GSM or variations or derivatives, CDMA (code division multiple access) or variations or derivatives, TDM (time division multiplexing) or variations or derivatives, or other cellular service standards. Wireless interface 1474 refers generally to non-cellular wireless interfaces, and can include personal area networks (such as Bluetooth, Near Field, etc.), local area networks (such as Wi-Fi), and/or wide area networks (such as WiMax), or other wireless communication.

Peripheral connections 1480 may include hardware interfaces and connectors, as well as software components (e.g., drivers and/or protocol stacks) to make peripheral connections. It will be understood that computing device 1400 could both be a peripheral device to other computing devices (via "to" 1482), as well as have peripheral devices connected to it (via "from" 1484). The computing device 1400 may have a "docking" connector to connect to other computing devices for purposes such as managing content on computing device 1400 (e.g., downloading and/or uploading, changing, synchronizing). Additionally, a docking connector can allow computing device 1400 to connect to certain peripherals that allow computing device 1400 to control content output, for example, to audiovisual or other systems.

In addition to a proprietary docking connector or other proprietary connection hardware, computing device 1400 can make peripheral connections 1480 via common or standards-based connectors. Common types of connectors can include a Universal Serial Bus (USB) connector (which can include any of a number of different hardware interfaces), a DisplayPort or MiniDisplayPort (MDP) connector, a High Definition Multimedia Interface (HDMI) connector, a Firewire connector, or other types of connectors.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus comprising: a first circuitry to receive a system operating characteristic guidance; a second circuitry to provide one or more manufacturing characteristics; and a third circuitry to store one or more system operating characteristics based upon the system operating characteristic guidance and the one or more manufacturing characteristics.

In example 2, the apparatus of example 1, comprising: one or more respectively corresponding memory storage elements to store the one or more manufacturing characteristics.

In example 3, the apparatus of example 1, wherein the system operating characteristic guidance includes at least one of: a hardware frequency guidance; a network bandwidth guidance; a network message rate guidance; and a register-state guidance.

In example 4, the apparatus of example 1, wherein the system operating characteristic guidance is from a job local power management device.

In example 5, the apparatus of example 1, comprising: one or more outputs to provide the one or more system operating characteristics.

In example 6, the apparatus of example 1, comprising: a fourth circuitry to output, based upon the one or more system operating characteristics, a modification indicator for at least one of: a hardware frequency; a network bandwidth; a message rate; and a register state.

In example 7, the apparatus of example 6, wherein the one or more system operating characteristics are additionally based upon at least one of: one or more current state characteristics; and one or more future state characteristics.

In example 8, the apparatus of example 1, wherein the one or more system operating characteristics are additionally based upon one or more network back-pressure characteristics.

Example 9 provides machine readable storage medium having machine executable instructions stored thereon that, when executed, cause one or more processors to perform an operation comprising: monitor network service demand information; estimate a network power consumption based upon the network service demand information; and determine a system operating characteristic guidance based upon the estimated network power consumption.

In example 10, the machine readable storage medium of example 9, wherein the network service demand information includes hardware monitoring data.

In example 11, the machine readable storage medium of example 10, wherein the network service demand information includes values from one or more network traffic delivery counters.

In example 12, the machine readable storage medium of example 9, the operation further comprising: receive an instruction from a system-level power manager carrying a response protocol for an estimate of power consumption; and determine the system operating characteristic guidance based upon both the estimated network power consumption, and the response protocol for the estimate of power consumption.

In example 13, the machine readable storage medium of example 9, wherein the network service demand information includes at least one of: application monitoring data; and an application-provided guidance.

In example 14, the machine readable storage medium of example 9, wherein the network service demand information includes at least one of: a network bandwidth; and a network message rate Example 15 provides machine readable storage medium having machine executable instructions stored thereon that, when executed, cause one or more processors to perform an operation comprising: request utilization information of a network traffic delivery component; determine an average power consumption based on the utilization information; and output a job power budget based on the average power consumption.

In example 16, the machine readable storage medium of example 15, wherein the average power consumption based on the utilization information is calculated based upon the utilization information of the network traffic delivery component.

In example 17, the machine readable storage medium of example 15, wherein the average power consumption based on the utilization information is provided by the network traffic delivery component.

In example 18, the machine readable storage medium of example 15, the operation further comprising: determine a response protocol for an estimated power consumption for a network traffic delivery component, based upon the job power budget.

In example 19, the machine readable storage medium of example 18, wherein the response protocol for the estimated power consumption for the network traffic delivery component includes at least one of: a hardware frequency protocol; a network bandwidth protocol; a network message rate protocol; and a register-state protocol.

In example 20, the machine readable storage medium of example 15, the operation further comprising: generate an instruction to a job-level power manager carrying the response protocol for the estimated power consumption for the network traffic delivery component.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. Non-transitory machine-readable storage medium having machine executable instructions stored thereon that, when executed, cause one or more processors to perform an operation comprising:
monitor network service demand information;
estimate a network power consumption based upon the network service demand information; and
determine a system operating characteristic guidance based upon the estimated network power consumption, wherein the system operating characteristic guidance includes at least one of: a hardware frequency guidance; a network bandwidth guidance; a network message rate guidance; or a register-state guidance.

2. The non-transitory machine-readable storage medium of claim 1, wherein the network service demand information includes hardware monitoring data.

3. The non-transitory machine-readable storage medium of claim 2, wherein the network service demand information includes values from one or more network traffic delivery counters.

4. The non-transitory machine-readable storage medium of claim 1, the operation further comprising:
receive an instruction from a system-level power manager carrying a response protocol for an estimate of power consumption; and
determine the system operating characteristic guidance based upon both the estimated network power consumption, and the response protocol for the estimate of power consumption.

5. The non-transitory machine-readable storage medium of claim 1,
wherein the network service demand information includes at least one of: application monitoring data; and an application-provided guidance.

6. The non-transitory machine-readable storage medium of claim 1,
wherein the network service demand information includes at least one of: a network bandwidth; and a network message rate.

7. Non-transitory machine-readable storage medium having machine executable instructions stored thereon that, when executed, cause one or more processors to perform an operation comprising:
request utilization information of a network traffic delivery component;
determine an average power consumption based on the utilization information; and
output a job power budget based on the average power consumption;
determine a response protocol for an estimated power consumption for the network traffic delivery component, based upon the job power budget, wherein the response protocol for the estimated power consumption for the network traffic delivery component includes at least one of: a hardware frequency protocol; a network bandwidth protocol; a network message rate protocol; or a register-state protocol.

8. The non-transitory machine-readable storage medium of claim 7,
wherein the average power consumption based on the utilization information is calculated based upon the utilization information of the network traffic delivery component.

9. The non-transitory machine-readable storage medium of claim 7,
wherein the average power consumption based on the utilization information is provided by the network traffic delivery component.

10. The non-transitory machine-readable storage medium of claim 7, the operation further comprising:
generate an instruction to a job-level power manager carrying the response protocol for the estimated power consumption for the network traffic delivery component.

11. A system comprising:
a memory;
a processor coupled to the memory; and
a wireless interface communicatively coupled to the processor, to allow the processor to communicate with another device, wherein the processor to:
monitor network service demand information;
estimate a network power consumption based upon the network service demand information; and
determine a system operating characteristic guidance based upon the estimated network power consumption, wherein the system operating characteristic guidance includes at least one of: a hardware frequency guidance; a network bandwidth guidance; a network message rate guidance; or a register-state guidance.

12. The system of claim 11, wherein the network service demand information includes hardware monitoring data.

13. The system of claim 12, wherein the network service demand information includes values from one or more network traffic delivery counters.

14. The system of claim 11, wherein the processor is to:
receive an instruction from a system-level power manager carrying a response protocol for an estimate of power consumption; and
determine the system operating characteristic guidance based upon both the estimated network power consumption, and the response protocol for the estimate of power consumption.

15. The system of claim 11, wherein the network service demand information includes at least one of: application monitoring data; or an application-provided guidance.

16. The system of claim 11, wherein the network service demand information includes at least one of: a network bandwidth; and a network message rate.

* * * * *